United States Patent [19]

Ishimaru et al.

[11] Patent Number: 5,442,496
[45] Date of Patent: Aug. 15, 1995

[54] MAGNETIC TAPE APPARATUS INCLUDING A READING HEAD FOR READING MAIN INFORMATION AND AUXILIARY INFORMATION OF A REPRODUCING REGION TOGETHER WITH AUXILIARY INFORMATION OF ANOTHER REGION

[75] Inventors: Yutaka Ishimaru; Hideo Yoshida, both of Higashihiroshima, Japan

[73] Assignee: Sharp Kabushiki Kaisha, Osaka, Japan

[21] Appl. No.: 82,722

[22] Filed: Jun. 28, 1993

[30] Foreign Application Priority Data

Jun. 30, 1992 [JP] Japan .................................. 4-173311

[51] Int. Cl.⁶ .......................................... G11B 15/087
[52] U.S. Cl. .............................. 360/72.2; 360/73.08
[58] Field of Search ................... 360/69, 71, 72.2, 27, 360/72.1, 63, 73.08

[56] References Cited

U.S. PATENT DOCUMENTS

| | | | |
|---|---|---|---|
| 3,986,208 | 10/1976 | Sykes | 360/27 X |
| 4,121,264 | 10/1978 | Kishi et al. | 360/71 X |
| 4,445,150 | 4/1984 | Nakajima et al. | 360/27 X |
| 4,870,515 | 9/1989 | Stokes | 360/72.2 |
| 5,296,977 | 3/1994 | Fujioka | 360/27 X |

FOREIGN PATENT DOCUMENTS

| | | | |
|---|---|---|---|
| 381266 | 8/1990 | European Pat. Off. | 360/71 |
| 4-38783 | 2/1992 | Japan . | |
| 5144121 | 6/1993 | Japan . | |

*Primary Examiner*—Aristotelis Psitos
*Assistant Examiner*—James L. Habermehl
*Attorney, Agent, or Firm*—Nixon & Vanderhye

[57] ABSTRACT

Main signals such as music and the like are read while auxiliary signals are simultaneously read from two sectors on a magnetic tape recorded in opposite directions using a tape reader having multiple heads. The read out signals are serially provided from a multiplexer and digitized by an A/D converter. A signal processing unit separates the digitized signals into main signals and auxiliary signals. A microcomputer carries out high speed search procedures using the auxiliary signals.

10 Claims, 17 Drawing Sheets

FIG.11

| AUX1 | AUX2 | MD1 | MD2 | MD3 | MD4 | MD5 | MD6 | MD7 | MD8 |

FIG.16
| RELATIONSHIP OF TUNE NUMBER | SEARCH DIRECTION | POSITION OF TUNE ON TAPE |
|---|---|---|
| $S_1 > S_2$<br>$S_1 < S_3$ | FORWARD | FORWARD DIRECTION ←→ REVERSE DIRECTION<br>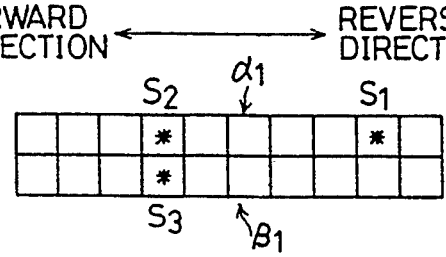 |
| $S_1 < S_2$<br>$S_1 < S_3$ | REVERSE | FORWARD DIRECTION ←→ REVERSE DIRECTION<br>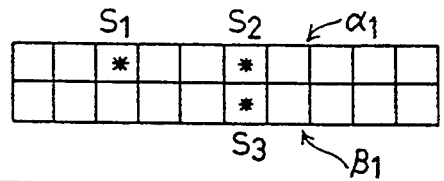 |
| $S_1 > S_2$<br>$S_1 > S_3$ | REVERSE | FORWARD DIRECTION ←→ REVERSE DIRECTION<br>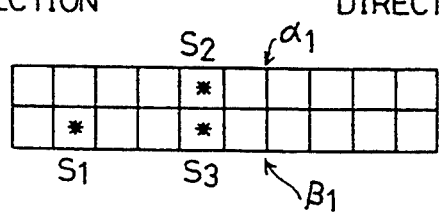 |

FIG.17

|  | COMPARISON OPERATION | SEARCH DIRECTION |
|---|---|---|
| $m_1$ | $(S_1 - S_2)(S_1 - S_3) < 0$ | FORWARD |
| $m_2$ | $(S_1 - S_2)(S_1 - S_3) > 0$ | REVERSE |
| $m_3$ | $S_1 = S_2$ | REVERSE |
| $m_4$ | $S_1 = S_3$ | FORWARD |
| $m_5$ | $S_1 - S_2 > 0$, $S_2$: UNKNOWN | FORWARD |
| $m_6$ | $S_1 - S_2 < 0$, $S_3$: UNKNOWN | REVERSE |
| $m_7$ | $S_2$: UNKNOWN, $S_3$: UNKNOWN | REVERSE |
| $m_8$ | $S_2$: UNKNOWN, $S_1 - S_3 > 0$ | REVERSE |
| $m_9$ | $S_2$: UNKNOWN, $S_1 - S_3 < 0$ | FORWARD |

MAGNETIC TAPE APPARATUS INCLUDING A READING HEAD FOR READING MAIN INFORMATION AND AUXILIARY INFORMATION OF A REPRODUCING REGION TOGETHER WITH AUXILIARY INFORMATION OF ANOTHER REGION

BACKGROUND OF THE INVENTION

1. Field of the Invention

The present invention relates to a magnetic tape apparatus for reproducing information such as music recorded on a magnetic tape, and more particularly, to a magnetic tape apparatus provided with a function to search a specified tune and reproducing the same.

2. Description of the Background Art

In a convention magnetic tape apparatus that reproduces an analog signal recorded on a magnetic tape, for example, a general stereo type cassette tape apparatus, the record region is divided into two regions on a magnetic tape, each having 2 tracks, whereby recording is carried out on a total of 4 tracks. In such a recording format, recording/reproduction is carried out by each side of the record region. Therefore, when the loading direction of a magnetic tape to an apparatus is only in one way, the magnetic tape is run in a corresponding direction to carry out recording/reproduction for both record regions.

For the reproduction of music and the like, there are some magnetic tape apparatus that detect the head position of a desired tune to reproduce the music. When a tune is to be reproduced, a signal on a magnetic tape is read out by a head to detect a non-recorded area which is identified as an interval period. The magnetic tape is forwarded at a high speed to the interval period between an immediate preceding tune and the desired tune.

In carrying out head position detecting operation of a tune where the desired tune resides in a record region that is not being reproduced, the magnetic tape must be fast-forwarded to the end of the current reproducing record region, the travel direction reversed, and fast-forwarded again to the beginning of a desired tune. The head position detecting operation is time consuming in such a case.

In comparison to the above-described magnetic tape apparatus that carries out recording/reproduction in analog format, a magnetic tape apparatus such as a DAT (Digital Audio Tape Recorder) that carries out recording/reproduction of high audio quality in digital format. One type of a DAT is a S-DAT including a fixed type head and has the travel direction of the tape fixed in one direction. In another digital magnetic tape apparatus, the travel direction of the tape moves in forward and backward directions such as the aforementioned analog, cassette type apparatus.

The digital magnetic tape apparatus employs a magnetic tape in which the record region is divided into two as in an analog cassette tape, each having 9 tracks to carry out recording. In one of the record region, 8 of the 9 tracks have the main information such as music recorded as —"main signals,—" and the remaining 1 track has position information indicating the recorded position of a tune and tune number information indicating the recorded order recorded as —"auxiliary signals.—"

In this magnetic tape apparatus, the magnetic tape is driven as in an analog cassette tape apparatus at the time of recording and reproduction. For example, when reproduction of one of the record regions is to be carried out, a main signal and an auxiliary signal are read out simultaneously from a main signal track and an auxiliary signal track, respectively, by which the sequential order of the tune currently being reproduced is identified from the auxiliary signal. Thus, a desired tune can be searched by fast-forwarding the magnetic tape while reproducing the auxiliary signal without having to detect an interval period Although detection of an interval period is eliminated in the above-described magnetic tape apparatus, an auxiliary signal in a record region can not be read out if it does not reside in the record region that is being reproduced. This means that the head position detecting operation of a tune recorded in a record region not currently being reproduced could not be carried out unless a procedure similar to that of the aforementioned magnetic tape apparatus is required. Thus, the head position detecting operation is still time consuming.

One exemplary magnetic recording/reproduction apparatus solving such disadvantages is disclosed in Japanese Patent Laying-Open No. 4-38783. Direction information indicating the travel direction of the magnetic tape is applied in addition to tune number information and the like. In this magnetic recording/reproduction apparatus, the travel direction of the tape at the time of reproduction and the record region in which the tune to be reproduced resides are identified by the tune number and direction information obtained by the auxiliary signal. Then, the travel direction of the ape is determined by the identified result to search the specified time.

If the direction information is recorded on the auxiliary signal track at short intervals in the above-described magnetic recording/reproduction apparatus, the position of a desired tune can be identified promptly. For example, in a tape having a plurality of tunes already recorded such as a commercially available music tape, all the information of the recorded tunes are known. Therefore, it is possible to record direction information as described above. However, in the case of recording on a blank tape, information of all the recorded tunes gathered after the recording operation will be recorded at one area at the beginning or head portion of the record region of the forward route side.

Under such circumstances, it is necessary to travel the magnetic tape to the head portion to obtain the required information, and then forward the magnetic tape to a target position. Thus, the head position detecting operation is time consuming having disadvantages similar to the cases described above.

SUMMARY OF THE INVENTION

An object of the present invention is to rapidly search specified information in a magnetic tape apparatus.

Another object of the present invention is to search effectively regardless of whether specified information resides in either the forward route record region or the return route record region on a magnetic tape.

To achieve the above objects, a magnetic tape apparatus according to the present invention includes a driving device for driving a magnetic tape in reciprocation; an information reading head for reading main information and auxiliary information concerning the main information recorded respectively on a forward route record region and a return route record region of the magnetic tape: and a search reproduction device for searching and reproducing specified main information by controlling the driving device based on record position information concerning each main information record position included in the auxiliary information read by the information reading head. The magnetic tape apparatus reads out auxiliary information recorded in one record region of the forward route record region or the return route record region when reproducing the main information and the auxiliary information recorded on the other region.

At the time of search-reproduction, the magnetic tape apparatus of the above-described structure can obtain auxiliary information from both the forward route and return route record regions because the auxiliary information recorded in the one record region is read out by the information reading head when the main information and the auxiliary information recorded on the other of the record regions are recorded. Thus, auxiliary information can be collected effectively from both record regions to reduce the time required for search-reproduction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram for describing the arrangement of signals provided form the multiplexer of FIG. 2.

FIG. 16 is a diagram for describing a method of determining a search direction according to auxiliary data by the magnetic tape apparatus of FIG. 1.

FIG. 17 represents a comparison operation according to the determination method of a search direction of FIG. 16.

DESCRIPTION OF THE PREFERRED EMBODIMENTS

An embodiment of the present invention will be described hereinafter with reference to FIGS. 1-17.

A magnetic tape apparatus according to the present embodiment includes a function to reproduce audio recorded by a digital signal and audio recorded by an analog signal. The recording format of digital audio and analog audio will first be described.

Figure 5:
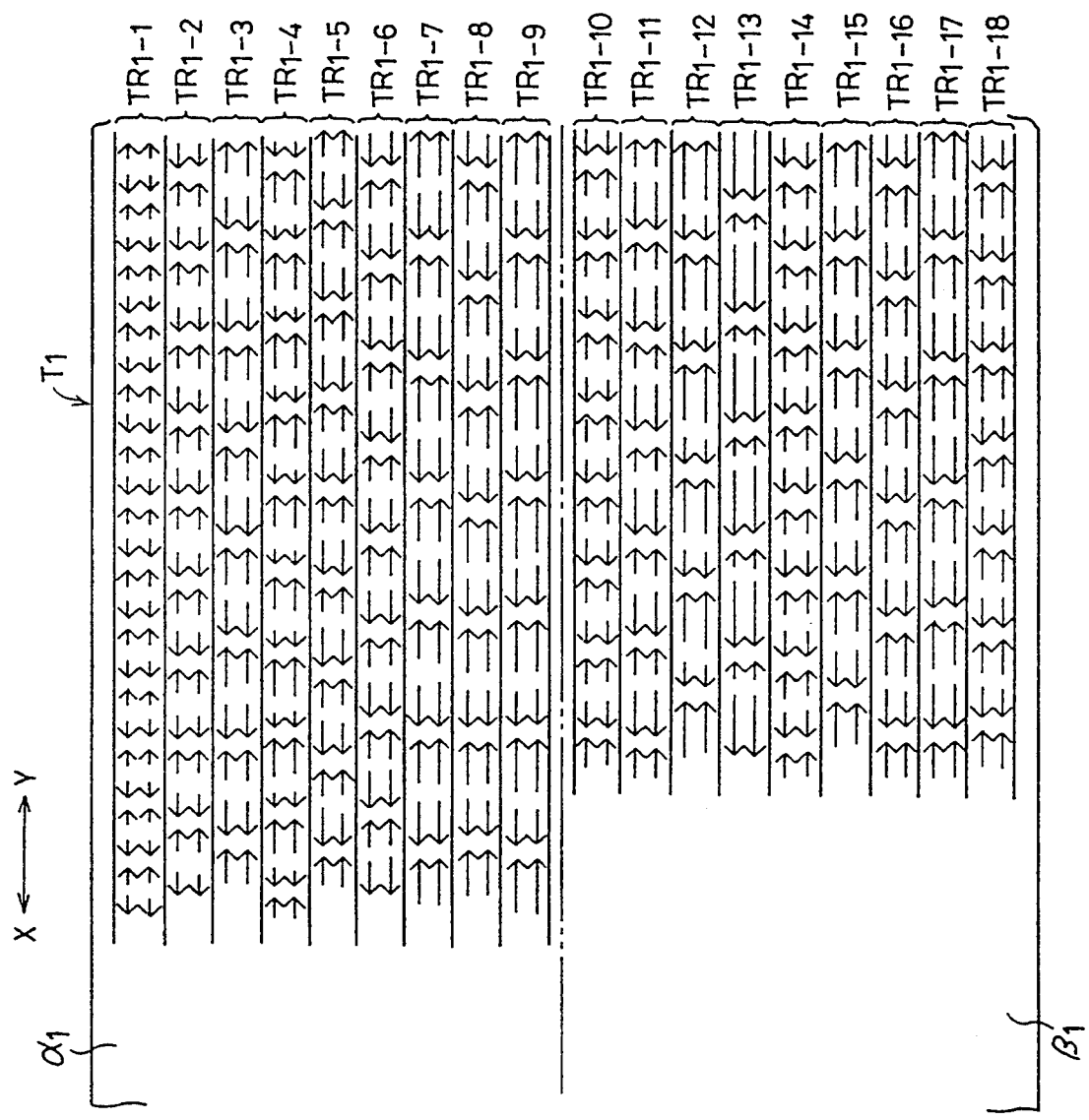
FIG. 5 is a diagram showing the track format of a magnetic tape in which a digital signal is recorded to be reproduced by the magnetic tape apparatus of FIG. 1.

Referring to FIG. 5, digital audio is recorded in 18 tracks TRI-1–TRI-18 formed across the width of a magnetic tape T1. In this recording format, tracks TRI-1–TRI-9 and tracks TRI-10–TRI-18 are allocated in the two-divided record regions of a forward route record region, i.e. a sector $\alpha_1$, and a return route record region, i.e. a sector $\beta_1$, respectively. Tracks TRI-2–TRI-9 and tracks TRI-10–TRI-17 have main information of music and the like recorded as main signals, and tracks TRI-1 and TRI-18 have auxiliary information concerning the main information recorded as auxiliary signals.

Magnetic tape T1 is run in the forward direction (in the direction of arrow X) to read out signals in track TRI-1–TRI-9. To read out the signals in tracks TRI-10–TRI-18, magnetic tape T1 is run in the return direction (in the direction of arrow Y).

When music, for example, is recorded on the tape as the main information, auxiliary information includes a tune number indicating the recorded position of that tune, an absolute elapsed time from the record start point, and TOC (Table of Contents) information. The above auxiliary information is used by the magnetic tape apparatus to search at high speed a specified tune for reproduction, i.e., high speed search.

TOC information is information regarding the recorded tune. More specifically, it includes music information, information on which of sectors $\alpha_1$ or $\beta_1$ the tune is recorded, a record position of a reverse signal, and the total time period of the musical performance of all the recorded tunes. The TOC information is recorded with several frames of tracks TRI-1 and TRI-18 as one unit. In commercially available music tapes which have tunes already recorded, TOC information including the above-described recorded contents is repeatedly recorded on tracks TRI-1 and TRI-18. In the case of a non-recorded tape such as a blank tape, TOC information of one unit is recorded in tracks TRI-1 and TRI-18 at the head position of sectors $\alpha_1$ and $\beta_1$, respectively. When TOC information recorded on a non-recorded tape is to be read out to carry out high-speed search, TOC information can be obtained only at the sector head positions.

Auxiliary signals are recorded in bit rates lower than that of a main signal. When high speed search is to be carried out while reading out auxiliary signals, magnetic tape T1 is run at a speed determined by a ratio ($b_2/b_1$ of the bit rate of the auxiliary signal ($b_1$) to the bit rate ($b_2$) of the main signal. However, if the $b_1$ approximates the $b_2$, the tape running speed will be reduced to disable high speed search. Also, if $b_1$ is too low in comparison with $b_2$, the reading of auxiliary signals at the time of normal reproduction will be too time-consuming, and an accurate elapsed time can not be obtained. Since 8 main signals are recorded in each of sectors $\alpha_1$ and $\beta_1$, the magnetic tape apparatus of the present invention has the bit rate of the auxiliary signal set to $\frac{1}{8}$ of the bit rate of the main signal by control of a microcomputer 17 described afterwards to carry out high speed search and reading of an auxiliary signal at the time of normal reproduction.

Figure 6:
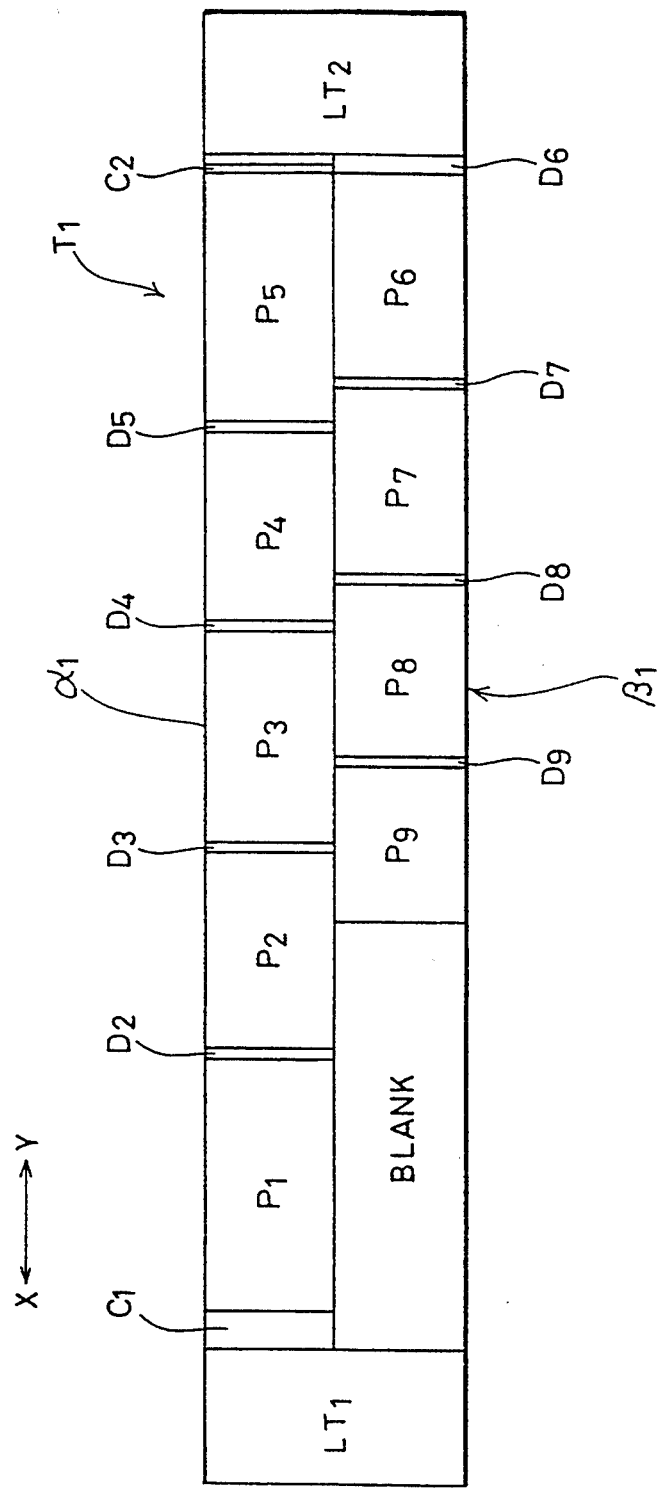
FIG. 6 is a diagram showing the tune arrangement when a tune is recorded on the magnetic tape apparatus of FIG. 5.

FIG. 6 shows a record format in which digital audio is recorded on magnetic tape T1.

Magnetic tape T1 has leader tapes $LT_1$ and $LT_2$ provided at both ends. The area corresponding to tracks TRI-2-TRI-9 of sector $\alpha_1$ has a lead-in signal $C_1$ recorded at the head position, followed by tunes $P_1$-$P_5$ recorded in sequence. Lastly, a reverse signal $C_2$ is recorded for reversing the gravel direction of the tape. Interval periods $D_2$-$D_5$ of non-recorded areas are provided between each of tunes $P_1$-$P_5$. Although not indicated in the drawings, interval signals corresponding to the interval periods $D_2$-$D_5$ are recorded in track TRI-1.

In sector $\beta_1$, tunes $P_6$-$P_9$ are recorded in sequence. An interval period $D_6$ indicating the interval between tunes $P_5$ and $P_6$ is provided between tune $P_6$ and leader tape $LT_2$. Interval periods $D_7$-$D_9$ are provided between each of tunes $P_6$-$P_9$. The area following tune $P_9$ is a non-recorded area of a blank region. Although not shown in the drawing, interval signals corresponding to interval periods $D_6$-$D_9$ are recorded on track TRI-18.

Figure 7:
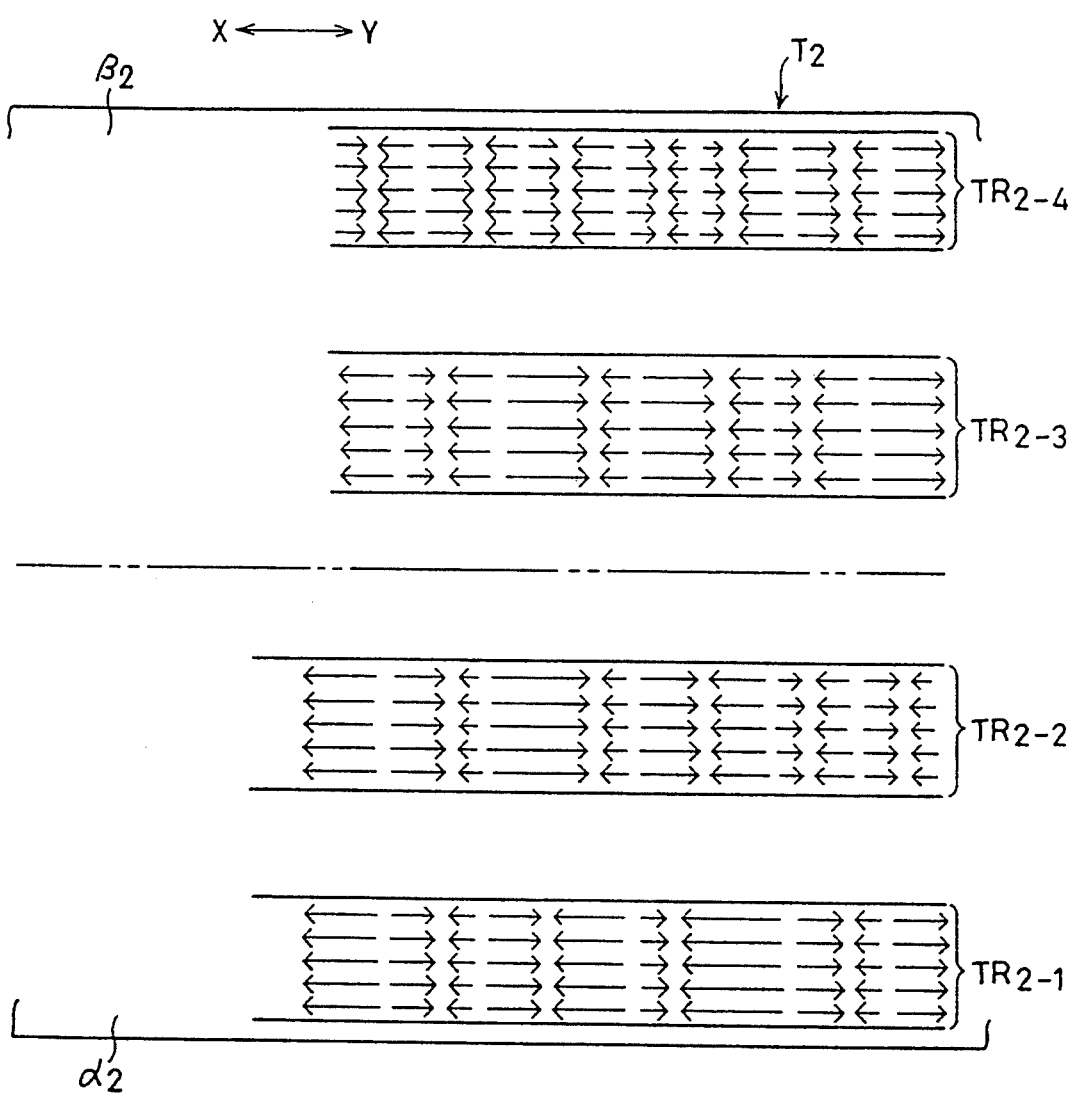
FIG. 7 is a diagram indicating a track format of a magnetic tape in which an analog signal is recorded to be reproduced by the magnetic tape apparatus of FIG. 1.

Referring to FIG. 7, analog audio is recorded in 4 tracks of TR2-1-TR2-4 on a magnetic tape $T_2$. In this recording format, the record region divided into 2 sectors of $\alpha_2$ and $\beta_2$ have corresponding tracks of TR2-1 and TR2-2 and tracks TR2-3 and TR2-4. Tracks TR2-1 and TR2-2 have audio signals of the left channel and the right channel recorded respectively, and tracks TR2-3 and TR2-4 have audio signals of the right channel and the left channel recorded, respectively.

To read out the main signals in tracks TR2-1 and TR2-2, magnetic tape T2 is run in the forward direction (in the direction of arrow Y). To read out the main signals in tracks TR2-3 and TR2-4, magnetic tape T2 is run in the reverse direction (in the direction of arrow X).

The arrows in tracks TRI-1-TRI-18 of FIG. 5 and tracks TR2-1-TR2-4 of FIG. 7 show the magnetized manner.

Figure 8:
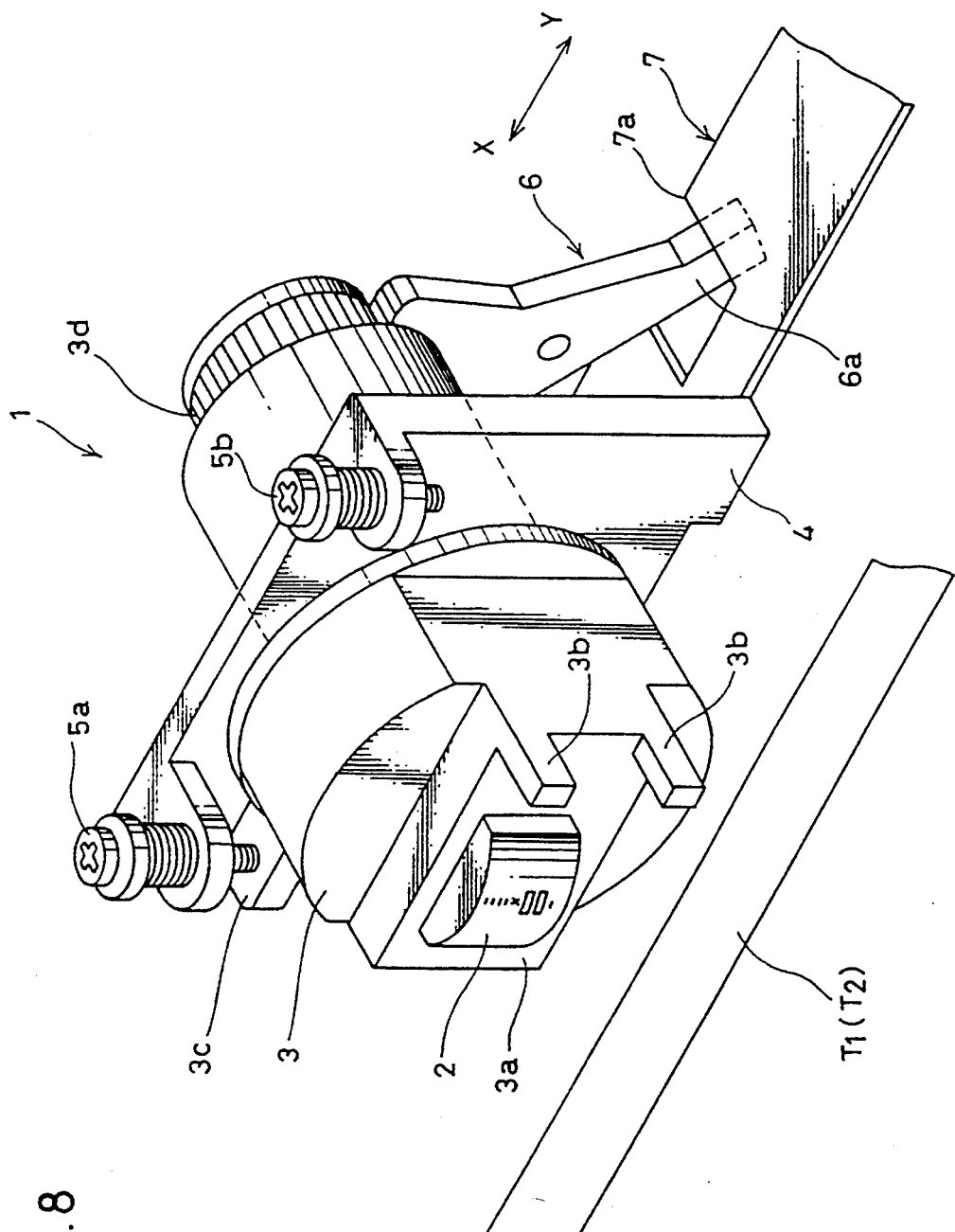
FIG. 8 is a perspective view of a reverse head device for reverse-driving a head in the magnetic tape apparatus of FIG. 1.

The head mechanism of the magnetic tape apparatus will be described hereinafter with reference to FIG. 8. The magnetic tape apparatus of the present invention includes a reverse head device 1 as shown in FIG. 8 as the head mechanism. Reverse head device 1 has a drum 3 incorporating a head main body 2 supported rotatably by a drum supporter 4.

Drum 3 is provided with tape guides 3b and 3b regulating the width direction travel of magnetic tape T1 (T2) at one side end of a fixing face 3a fixing head main body 2. Drum 3 is provided with an abutment plate 3c and a gear 3d at the drum supporter 4 side and the rear side portion, respectively. Although drum 3 rotates in a manner supported by drum supporter 4, the rotation of drum 3 is limited within a range of 180° by abutment plates 3c abutting against stoppers 5a and 5b fixed to both the upper end sides of drum supporter 4. Stoppers 5a and 5b are adjustable in height.

A fan-shaped gear 6 for reversing drum 3 is provided below gear 3d. Fan-shaped gear 6 is provided rotatably to engage gear 3d. A parallel displacement member 7 driven by a slide driving device not shown to move in the direction of X-Y in the drawing is provided below fan-shaped gear 6. Parallel displacement member 7 is provided with a notch 7a to which a lever portion 6a located at the lower side of fan-shaped gear 6 is locked.

In reverse head device 1 of the above-described structure, a parallel transition of parallel displacement member 7 in the X-Y direction causes a rotation of fan-shaped gear 6, resulting in a rotation of gear 3d. In accordance with the rotation of gear 3d, drum 3 is rotated, whereby head main body 2 is reversed 180°. At the time of reproduction, reverse head device 1 is driven by a driving device not shown to move from the standby position shown in FIG. 8 to a predetermined position to be in contact with magnetic tape T1 (T2). When head main body 2 is to be reversed, reverse head device 1 is temporarily withdrawn to the standby position to carry out rotation of drum 3.

Figure 9:
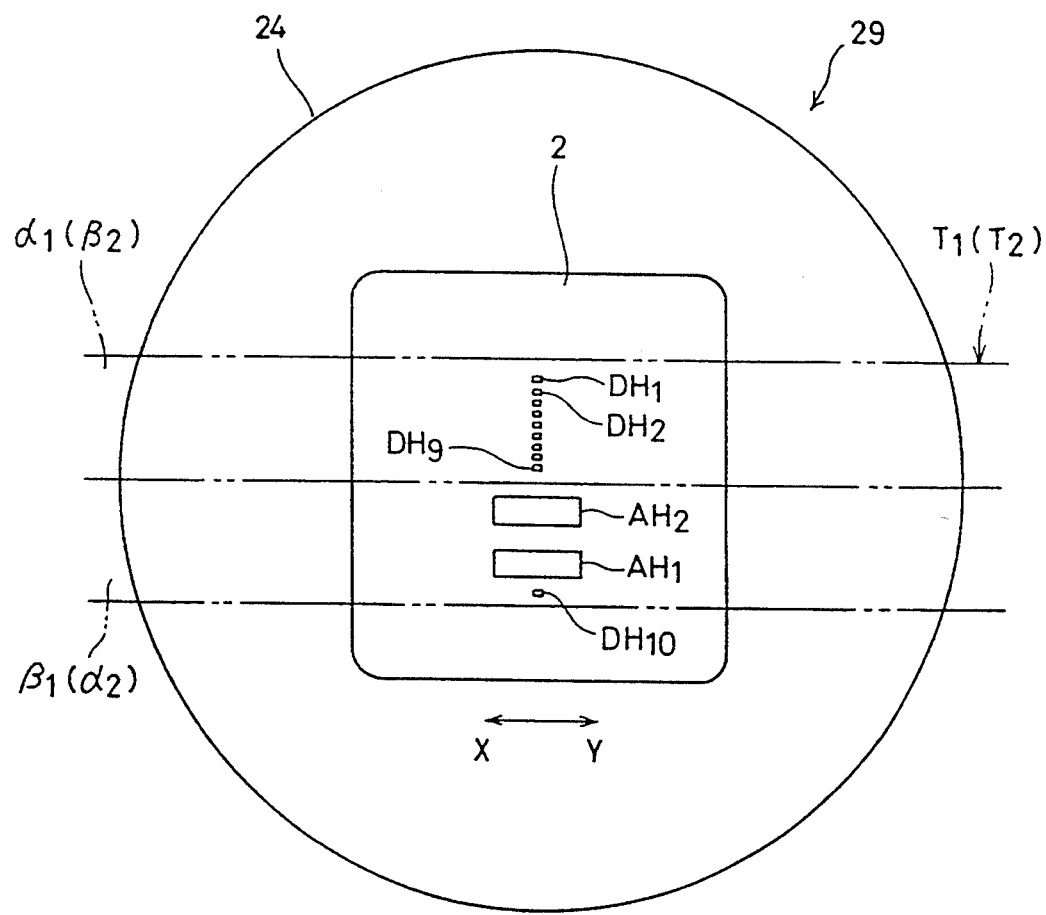
FIG. 9 is a front view of the reverse head device of FIG. 1 showing the arrangement of the head.

Referring to FIG. 9, head main body 2 is provided with digital heads DH1-DH9 in equal distances at one side of the tape-containing-face from the middle thereof as information reading means. On the other side, heads AH1 and AH2 for analog and a head DH10 for digital are provided as information read out means.

At the time of reproduction of digital audio, head main body 2 has heads DH1-DH9 read out signals from tracks TRI-1-TRI-9 in sector $\alpha_1$ and head DH10 read out a signal from track TRI-19 in sector $\beta_1$ when magnetic tape T1 runs in the direction of arrow X. At the time of digital audio reproduction when magnetic tape T1 travels in the direction of arrow Y, head main body 2 rotates 180° from the above-described position, whereby heads DH1-DH9 read out signals from tracks TRI-18-TRI-10 in sector $\beta_1$, and head DH10 reads out signals from track TRI-1 of sector $\alpha_1$.

At the time of reproduction of analog audio, head main body 2 has heads AH1 and AH2 read out signals from tracks TR2-1 and TR2-2, respectively, when magnetic tape T2 travels in the direction of arrow Y. When magnetic tape T2 travels in the direction of arrow X, head main body 2 rotates 180° from the above-position, whereby heads AH1 and AH2 read out signals from tracks TR2-4 and TR2-3 in sector $\beta_2$.

Because head DH10 is provided in head main body 2, the width of heads AH1 and AH2 may be smaller than the normal width of tracks TR2-1-TR2-4. However, this difference is so small that the level and frequency characteristics of a read out signal can be ensured substantially as in the normal case.

The digital reproduction system and the mechanism system of the magnetic tape apparatus of the present invention will be described hereinafter.

Figure 1:
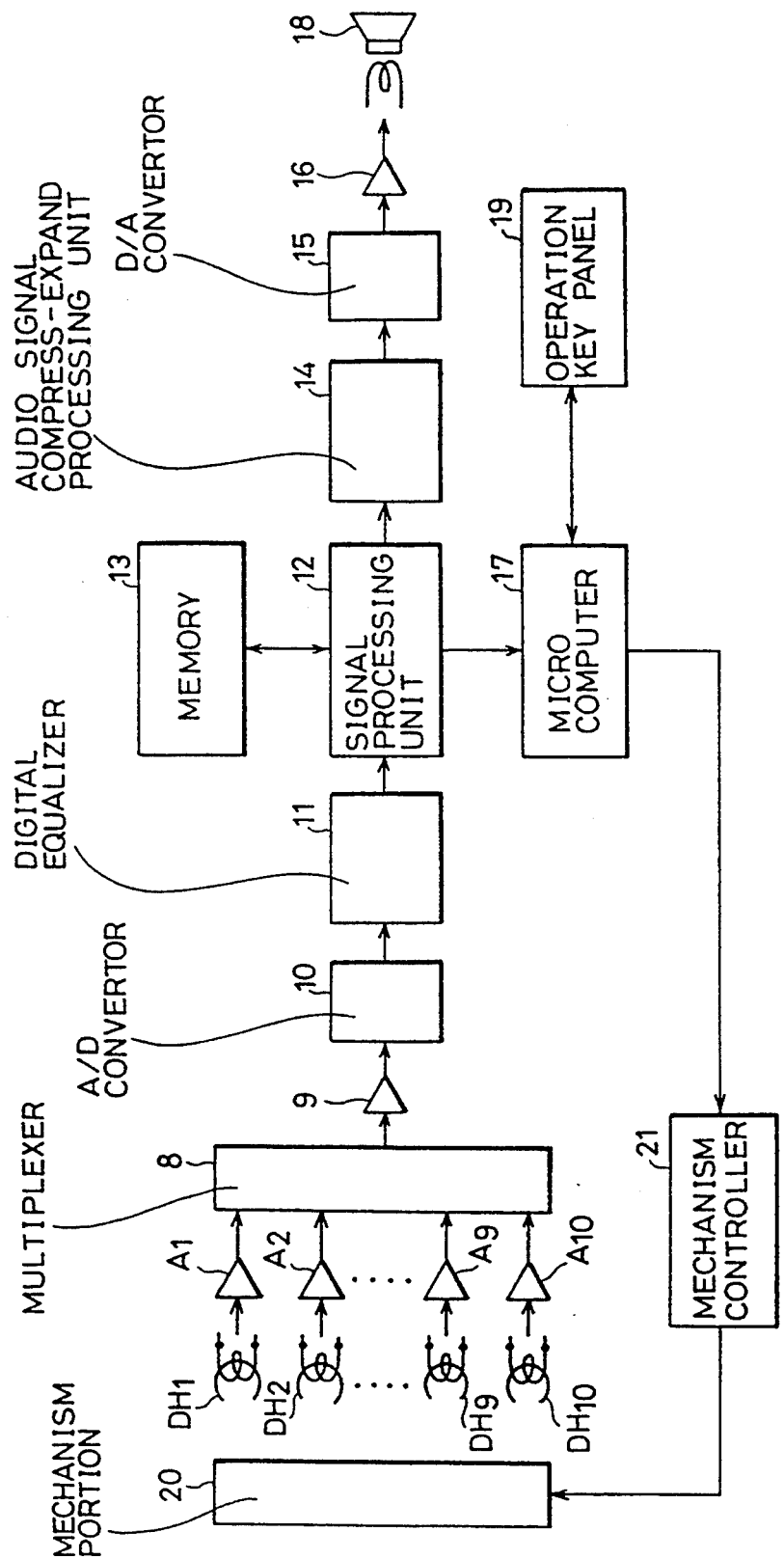
FIG. 1 is a block diagram showing a structure of a magnetic tape apparatus according to an embodiment of the present invention.

Referring to FIG. 1, the digital reproduction system includes heads DH1-DH10, preamplifiers A1-A10, a multiplier 8, a buffer amplifier 9, an A/D converter 10, a digital equalizer 11, a signal processing unit 12, a memory 13, an audio signal compress-expand processing unit 14, a D/A converter 15, an audio amplifier 16, and a microcomputer 17.

As described before, heads DH2-DH9 read out main signals, and heads DH1-DH10 read out auxiliary signals.

Preamplifiers A1–A10 amplify signals provided from heads DH1–DH10 to a level where a process at each succeeding stage can be carried out. Predetermined frequency characteristics can be specified for preamplifiers A1–A10 to facilitate the process in the succeeding stage of digital equalizer 11.

Multiplexer 8 is a circuit to switch the output signals of preamplifiers A1–A10 as serial signals. In practice, preamplifiers A1–A10 and multiplexer 8 are integrated to form a lead amplifier circuit. The details thereof will be described afterwards.

Buffer amplifier 9 is a circuit for establishing impedance matching between an output of multiplexer 8 and an input of A/D converter 10. A/D converter 10 is a circuit for digitizing an output signal of buffer amplifier 9 at a predetermined sampling frequency. Digital equalizer 11 is a circuit for applying waveform equalization to the output data of A/D converter 10 as will be described in details afterwards.

Signal processing unit 12 is a circuit for carrying out error correction by a Reed-Solomon method and the lie to rearrange data. When magnetic tape T1 having signals recorded in the opposite direction in sector $\beta_1$ is run in the direction of arrow X at the time or reproduction, the auxiliary signal read out by DH10 will be in a format of reading which is arranged in reverse order.

Signal processing unit 12 brings these signals to its regular arrangement by storing a signal of a constant length in memory 13. This will be described in detail later. Signal processing unit 12 also separates audio data and auxiliary data which are digital data of main signals and auxiliary signals respectively to provide the audio data to audio signal compress-expand processing unit 14 and the auxiliary data to microcomputer 17.

Memory 13 temporarily stores the above-described data. In order to reverse the data arrangement, data writing and reading is carried out by a FILO (First In Last Out) manner. Audio signal compress-expand processing unit 14 applies an expanding process to the output of signal processing unit 12. D/A converter 15 converts the output of audio signal compress-expand processing unit 14 into an analog audio signal. Audio amplifier 16 amplifies the above-described audio signal which is provided to a speaker 18.

Microcomputer 17 includes the function to display and control the musical performance time of a tune and its tune number with respect to an operation key panel 19 according to the auxiliary data from signal processing unit 12. Microcomputer 17 is also provided with the function to control height speed search. When microcomputer 17 receives an instruction of high speed search by operation key panel 19, various instructions of reproduce, halt, fast-forward, and playback are provided to mechanism controller 21 using auxiliary data.

Figure 10:
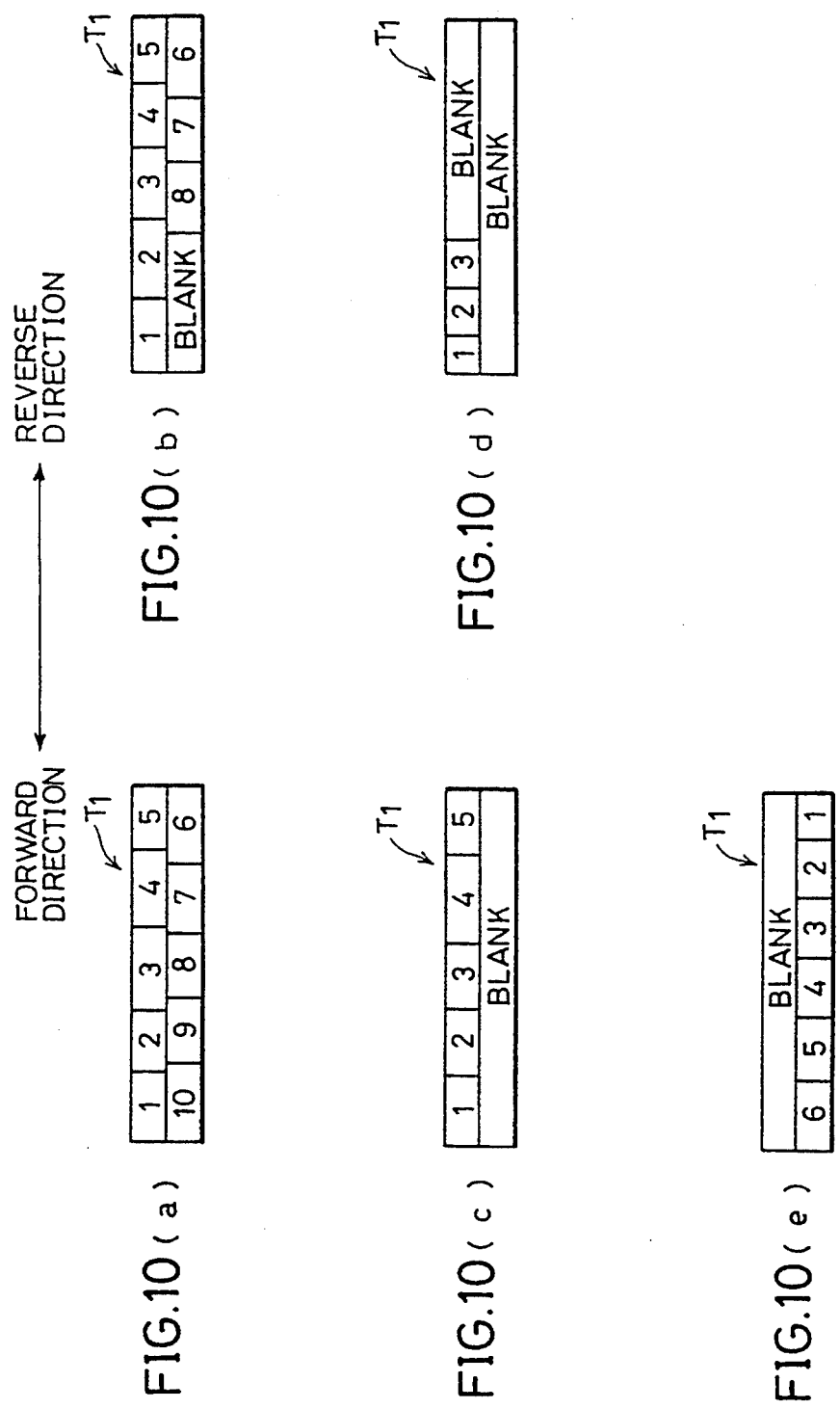
FIG. 10 is a diagram for describing the recording pattern of tunes in a magnetic tape according to an embodiment of the present invention.

When magnetic tape T1 is completely recorded with tunes as shown in (a) of FIG. 10, microcomputer 17 determines the travel direction of the tape for high speed search according to the three cases shown in FIG. 16 based upon the relationship between a specified number of a tune $S_1$ and the sequential numbers of reproduced times $S_2$ and $S_3$. $S_1$, which is a number of a specified tune, indicates the sequence order of a tune specified to be reproduced. $S_2$, which is a reproduced tune number, represents a sequence order of a tune in sector $\alpha_1$ that is currently being reproduced in the forward travel direction of a tape. $S_3$, which is a reproduced tune number, represents a sequence order of a tune in sector $\beta_1$ that is currently being reproduced in a reverse travel direction of the tape.

Referring to FIG. 16, when the relationship of $S_1 > S_2$ and $S_1 < S_3$ is satisfied, the tune of the specified number $S_1$ can not be identified in which of sectors $\alpha_1$ or $\beta_a$ it is recorded. However, at least its location can be recognized as being recorded between the reproduced tune number $S_2$ and the reproduced tune number $S_3$. Because the magnetic tape apparatus of the present invention carries out high speed searching while reading out auxiliary signals from sectors $\alpha_1$ and $\beta_1$, the search for a specified tune is possible if the search direction is identified. Therefore, in the above case, microcomputer 17 will identify the above-described state by comparison operation (m1) of FIG. 17, whereby magnetic tape T1 is run in the forward direction.

When the relationship of $S_1 < S_2$ and $S_1 < S_3$ is satisfied, it is appreciated that the tune of the specified number $S_1$ is recorded before the tune of reproduced turn number $S_2$ in sector $\alpha_1$. In this case, microcomputer 17 determines the above state from the comparison operation of (m2) in FIG. 17, whereby magnetic tape T1 is run in the reverse direction. When the relationship of $S_1 > S_2$ and $S_1 > S_3$ is satisfied, it is appreciated that the tune of the specified number $S_1$ is recorded after the tune of recorded turn number $S_3$ in sector $\beta_1$. In this case, microcomputer 17 causes magnetic tape T1 to be traveled in the reverse direction as in the above-described case.

When the tune reproduced. in sector $\alpha_1$ is the tune of the specified. number $S_1$, i.e. when the relationship of $S_1 = S_2$ is satisfied, this state is identified by the comparison operation of (m3) in FIG. 17, whereby magnetic tape T1 is traveled in the reverse direction. When the tune reproduced in sector $\beta_1$ is the tune of the specified number $S_1$, i.e. when the relationship of $S_1 = S_3$ is satisfied, microcomputer 17 determines this states by the comparison operation of (m4) in FIG. 17, whereby magnetic tape T1 is run in the forward direction.

When there is a blank area of a non-recorded area in magnetic tape T1 as shown in (b)–(e) of FIG. 10, microcomputer 17 will read the number of a tune as "unknown" since no auxiliary signal is recorded in the blank region. The determination method of a search direction in respective cases will be described hereinafter.

When there is a blank region in sector $\beta_1$ as shown in (b) and (c) in FIG. 10 and $S_1 > S_2$, $S_3$: unknown, it is appreciated that the tune of specified number $S_1$ is recorded after the tune of reproduced tune number $S_2$ in sector $\alpha_1$ and before the blank region in sector $\beta_1$. Microcomputer 17 determines the above state according to a comparison operation of (m5) in FIG. 17, whereby magnetic tape T1 is traveled in the forward direction. When $S_1 < S_2$, $S_3$: unknown under the above-described record state, it is appreciated that the tune of specified number $S_1$ is recorded in an area before reproduced tune number $S_2$ of sector $\alpha_1$. Microcomputer 17 determines this states by a comparison operation of (m6) in FIG. 17, whereby magnetic tape T1 is run in the reverse direction.

When only a few tuners are recorded from the head portion of sector $\alpha_1$ and the remaining areas of sector $\alpha_1$ and the whole sector $\beta_1$ are all blank and $S_2$ and $S_3$ are both unknown, it is recognized that the tune of specified number $S_1$ is recorded in a region before the blank region of sector $\alpha_1$. Microcomputer 17 determines this state by the conditions of (m7) in FIG. 17, whereby magnetic tape T1 is run in the reverse direction.

When sector $\alpha_1$ is completely a blank area and sector $\beta_1$ is recorded thoroughly with tunes as shown in FIG. 10(e) with the relationship of $S_1 > S_3$ and $S_2$: unknown, it is appreciated that the tune of specified number $S_1$ is recorded after the recorded tune number $S_3$ in sector $\beta_1$. Microcomputer 17 determines this state by a comparison operation of (m9) in FIG. 17, whereby magnetic tape T1 is run in the forward direction.

Microcomputer 17 realizes high speed searching using the above-described process.

As shown in FIG. 1, the mechanism system includes a mechanism portion 20, and a mechanism controller 21. Mechanism portion 20 serving as driving means includes the described reverse head device 1, tape travel mechanism, and circuits driving the same. Mechanism controller 21 is a circuit controlling each unit of mechanism portion 20 according to an instruction from microcomputer 17.

Figure 2:
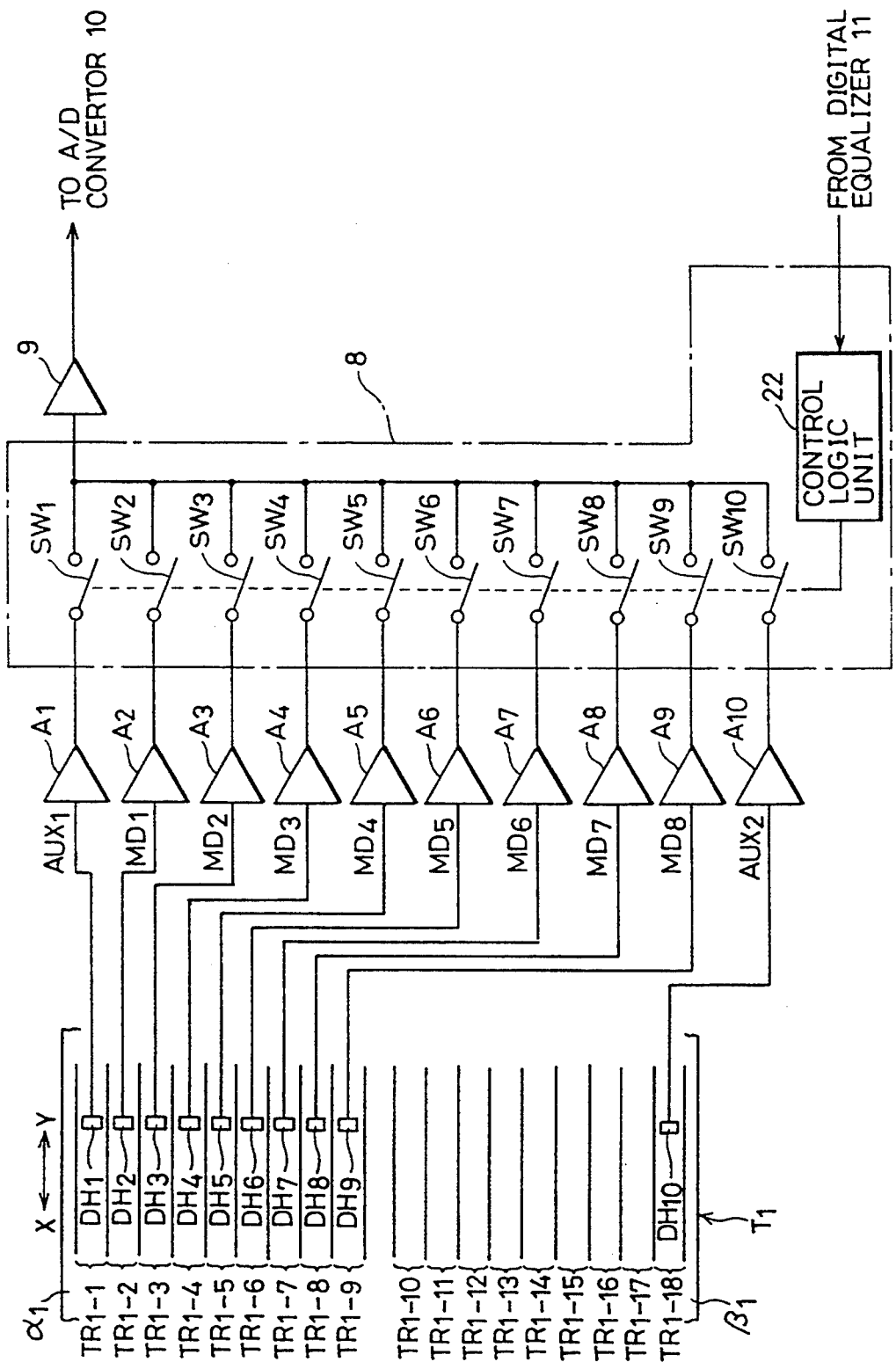
FIG. 2 is a circuit diagram showing in details a multiplexer in the magnetic tape apparatus of FIG. 1.

Referring to FIG. 2, multiplexer 8 includes switches SW1–SW10 for switching the outputs of preamplifiers A1–A10, and an control logic unit 22 for controlling the ON/OFF of switches SW1–SW10. Control logic unit 22 carries out the control of ON/OFF of switches SW1–SW10 according to a control signal from digital equalizer 11.

Figure 11:
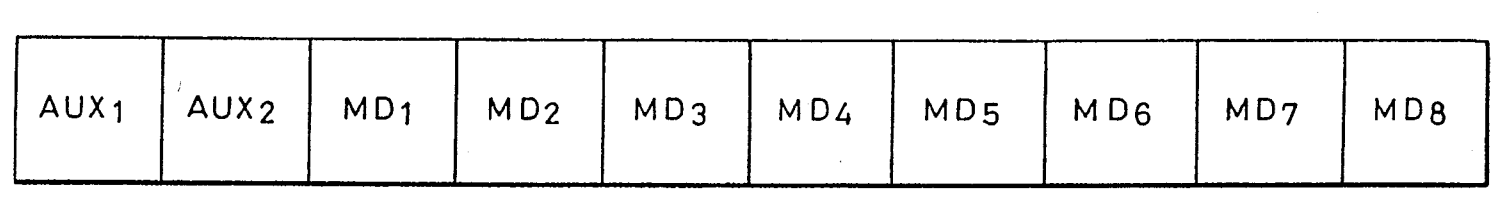

More specifically, control logic unit 22 turns on the switches one by one in the order of switch SW1, SW10, and SW2–SW9. This sequential switching operation is repeated continuously. As a result, auxiliary signals AUX1 and AUX2 read out by heads DH1 and DH10, respectively, and main signals MD1–MD8 read out by heads DH2–DH9, respectively, are provided continuously to buffer amplifier 9, as shown in FIG. 11.

Figure 3:
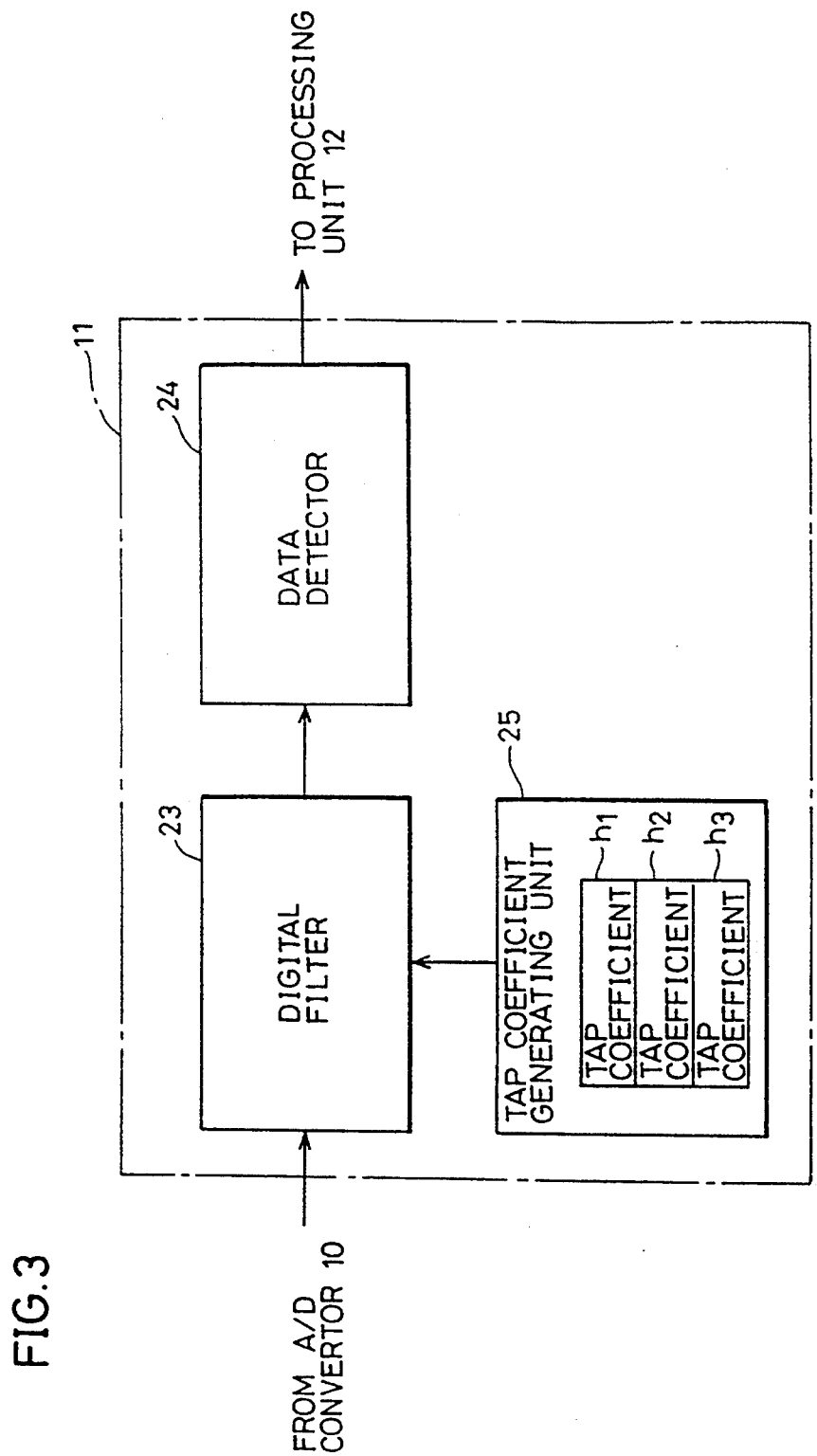
FIG. 3 is a block diagram showing in details a digital equalizer in the magnetic tape apparatus of FIG. 1.

Referring to FIG. 3, digital equalizer 11 includes a digital filter 23, a data detector 24, and a tap coefficient generator 25. Digital filter 23 is a finite impulse response (FIR) (non-circulation) type filter having a linear phase (i.e. without group delay). Digital filter 23 applies waveform equalization to the main signal and auxiliary signal from A/D converter 10 to equalize the phases of both signals. Data detector 24 is a circuit for detecting binary data, i.e. "0" and "1, as a result of waveform equalization. Tap coefficient generator 25 generates a tap coefficient to be supplied to digital filter 23.

The signals obtained from digital heads DH1–DH10 have significantly deteriorated characteristics in the high frequency range due to electromagnetic conversion characteristics of magnetic tape T1 and heads DH1–DH10. As a result, the signal waveforms are distorted or blunt. Tap coefficient generator 25 generates tap coefficients $h_1$ and $h_2$ for main signals and tap coefficient $h_3$ for an auxiliary signal compensate for frequency characteristics of the high frequency range. Tap coefficients $h_1$–$h_3$ also account for the fact that they are used in matching the phases of a main signal and an auxiliary signal in digital filter 23.

Because an already recorded tape, such as a commercially available music tape is produced at high speed dubbing by a travel of a direction of unity, a signal is recorded in a normal manner in one sector, whereas a signal is recorded in the opposite direction on the other sector. When reading out a signal from the other sector, the tape is run in a direction opposite to the tape travel direction used at the time of recording. Therefore the characteristics of the read out signal differs from that of recording.

Digital filter 23 carries out waveform equalization appropriately using tap coefficient $h_1$ for signals read out from a sector in which the signal is recorded normally, and tap coefficient $h_2$ for signals read out from a sector in which signals are recorded in the opposite direction. When a user carries out recording on a tape not-recorded, the tape travel direction will note differ between recording and reproduction, so that digital filter 23 carries out waveform equalization only with tap coefficient $h_1$.

Because an auxiliary signal is recorded at a bit rate which is $\frac{1}{8}$ of that of a main signal, the recording frequency thereof is low, and influence of electromagnetic conversion characteristics is low. Therefore, even when the tap travel direction differs for recording and reproduction, as in the case of a commercially recorded music tape, there is no need to switch tap coefficients $h_1$ and $h_2$ for a main signal. Only one tap coefficient $h_3$ for auxiliary data is required. In a magnetic tape device where auxiliary signals are read out simultaneously from both sectors $\alpha_1$ and $\beta_1$, the tape travel direction at the time of reading out from one of sectors $\alpha_1$ or $\beta_1$ differs from that at the time of recording. Waveform equalization of an auxiliary signal is carried out only with the tap coefficient of $h_3$ in digital filter 23.

Although an auxiliary signal is read out at a tape travel speed of $b_2/b_1$ of normal reproduction at the time of high speed search in the magnetic tape apparatus of the present invention, the bit rate of an auxiliary signal becomes $b_2/b_1$ by this tape travel speed at the time of reproduction. Therefore, the bit rate of an auxiliary signal is identical to that of a main signal. Therefore, the tap coefficient must be switched to $h_1$ or $h_2$ from $h_3$ in reading out an auxiliary signal at the time of high speed search.

Figure 4:
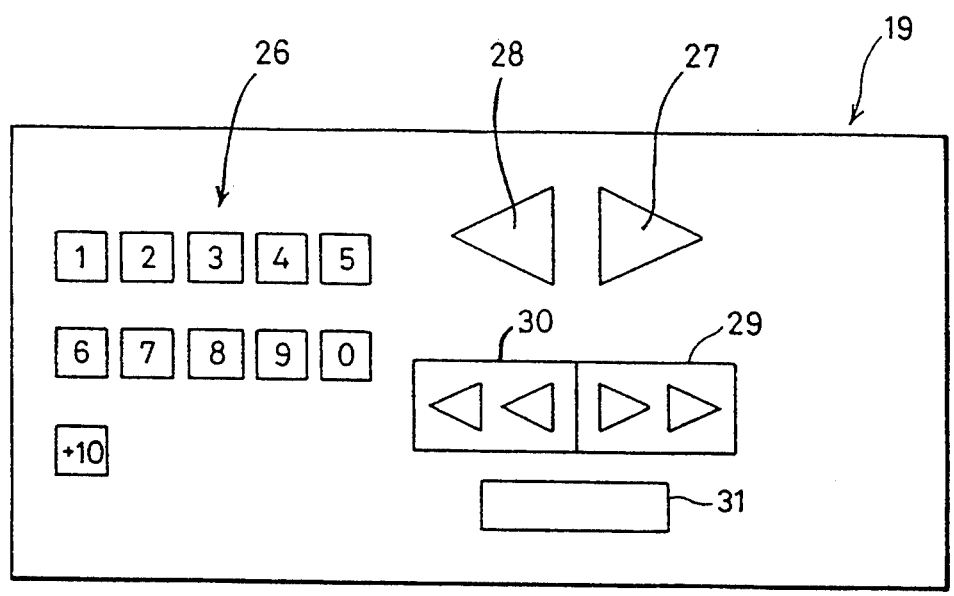
FIG. 4 is a diagram for describing the operation key panel in the magnetic tape apparatus of FIG. 1.

Referring to FIG. 4, operation key panel 19 includes a ten-key 26, reproduction keys 27 and 28, an FF key 29, an REW key 30, and a display unit 31. Ten key 26 is provided for specifying the number of a tune to be reproduced, and includes 10 keys of "0"–"9", and a plus-10 key of the two digit for specifying a tune number exceeding 11. Reproduction key 27 is an operation key for carrying out reproduction with the travel direction of the tape in the forward direction. Reproduction of sector $\alpha_1$ is carried out by an operation of this key. Reproduction key 28 is an operation key for carrying out reproduction with the travel direction of the tap in the reverse direction. Reproduction of sector $\beta_1$ is carried out by an operation of this key. FF key 29 is an operation key for carrying out fast-forward in the forward direction. REW key 30 is an operation key for carrying out rewinding in the reverse direction. Display unit 31 is formed of a liquid crystal display panel, for example, to display the sequence order of a tune or elapsed time and the like.

The head position detecting operation of a desired tune out of tunes recorded on magnetic tape T1 according to control of microcomputer 17 in the magnetic tape apparatus of the present invention of the above-described structure will be described hereinafter with reference to the flow charts of FIGS. 12–14. Although the embodiment is described concerning a direct search in which a number of a tune is specified by input via ten-key 26 of operation key panel 19, it is also possible to carry out a head position detecting operation by specifying a desired tune as a number of tunes before or after the current tune by operation of a combination of ten-key 26, FF key 29, and REW key 30.

In the following description, sectors $\alpha_1$ and $\beta_1$ are termed as a sector unless stated otherwise.

Figure 12:
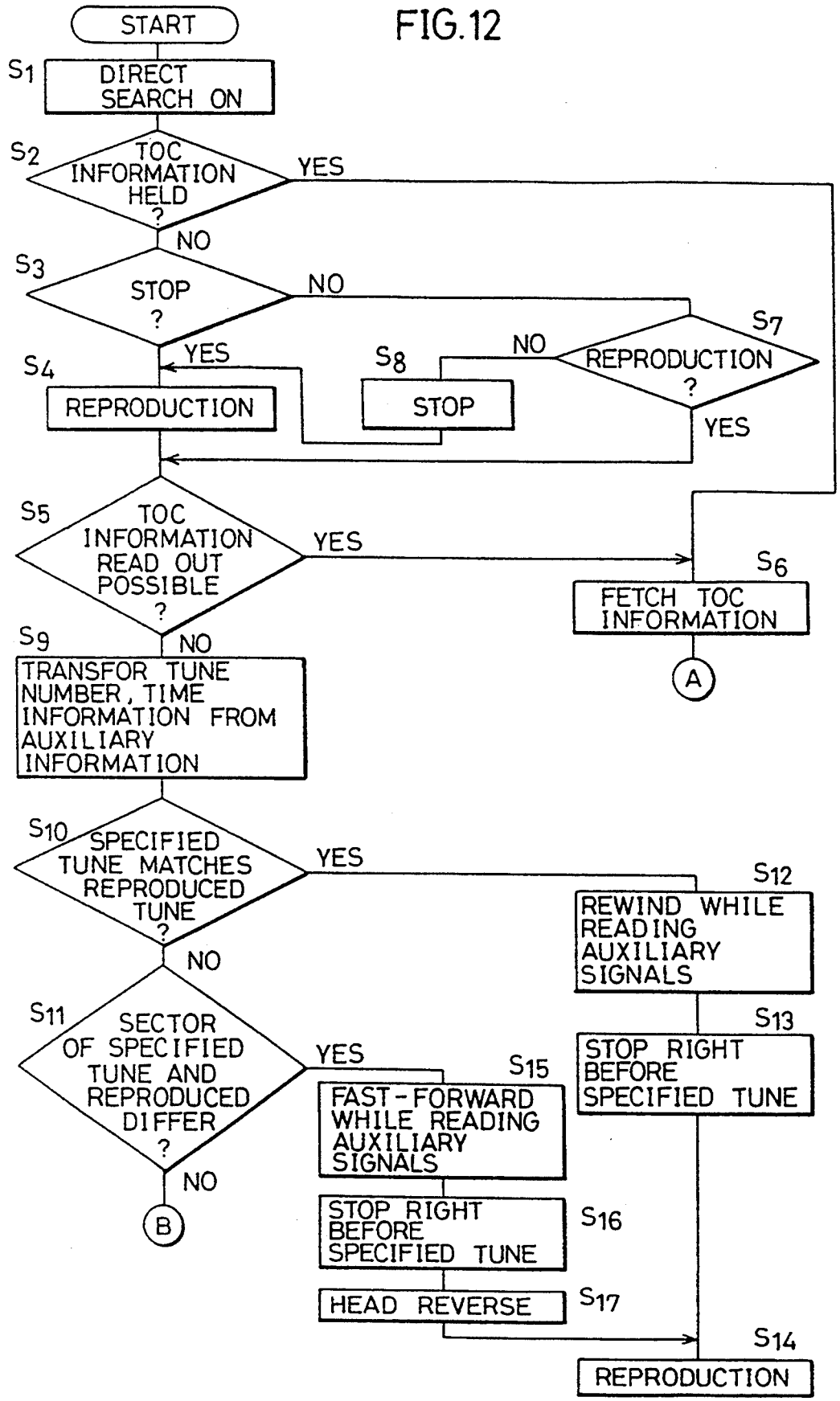
FIG. 12 is a flow chart showing the operation procedure of search-reproduction carried out using mainly an auxiliary signal by the magnetic tape apparatus of FIG. 1.
Figure 13:
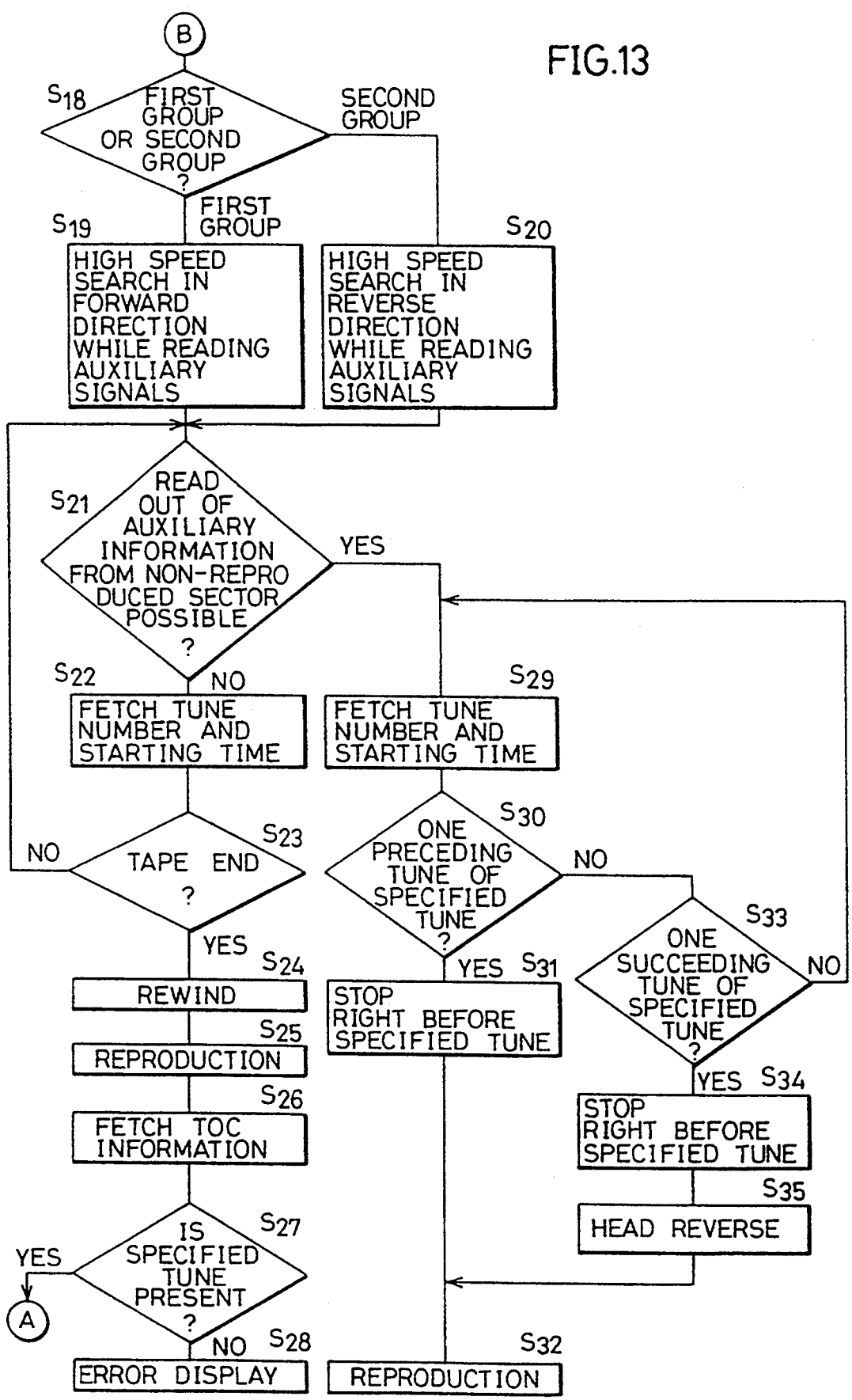
FIG. 13 is a flow chart showing a process showing the flow chart of FIG. 12.

Referring to the flow charts of FIGS. 12 and 13, a search operation mainly based on an auxiliary signal is indicated. When a direct search operation is turned ON (S1), microcomputer 17 makes determination whether TOC information id held in the internal memory (S2). If determination is made that TOC information is not held in memory at S2, the control proceeds to S3 where determination is made whether the magnetic tape apparatus is in a stop state. If YES, the control proceeds to S4 to carry out a reproduction operation, and then to S5 where determination is made whether TOC information is read or not.

If a determination is made that TOC information is held in memory at S2, the TOC information is fed into the processing unit in microcomputer 17 (S6), whereby the process proceeds to S36 described later. When a determination is made that the magnetic tape apparatus is no in a stop state at S3, a determination is made whether a reproduction state entered (S7). If a determination is made that the magnetic tape apparatus is in a reproduction state at S7, the process proceeds to S5. If a determination is made that a reproduction state is not entered, the apparatus is set to a stop state (S8) since there is possibility of fast-forward or rewind being carried out. The process proceeds to S4.

When h determination is made that TOC information could not be read out at S5, the sequence order and time information of the currently reproduced tune are obtained from the auxiliary information which is fed to the processing unit of microcomputer 17 (S9). Then, a determination is made whether the tune of the specified number is identical with the tune of reproduced tune number (S10). If determination is made that the specified number does not match the reproduced tune number at S10, the process proceeds to S11 where determination is made whether the tune of the specified number resides in a sector different from the sector in which the current tune is being reproduced. If NO, the process proceeds to S18 described later.

When a determination is made that the tune of the specified number is identical to the current reproduced tune at S10, a rewind operation is carried out while reading out auxiliary signals from tracks TRI-1 and TRI-18 at a speed $b_2/b_1$ times the tape travel speed of normal reproduction, i.e. a speed of 8 times that of normal reproduction in the magnetic tape apparatus of the present invention (S12). A temporary halt state occurs right before the start of the specified tune (S13), and reproduction is carried out (S14).

When determination is made at S11 that the specified tune resides in a sector different from the sector in which the currently reproduced tune resides, fast-forward is carried. out while reading out auxiliary signals from tracks TRI-1 and TRI-18 at a speed $b_2/b_1$ times (eight times) the tape travel speed of normal reproduction (S15). Then, a temporary halt state occurs right before the specified tune (S16), head main body 2 is reversed (S17), and reproduction is carried out at S14.

Referring to FIG. 13 succeeding S11, determination is made (S18) whether the comparison operation shown in FIG. 17 belongs to the first group of (m1), (m5) and (m9) where the search direction is in the forward direction, or belongs to a second group of (m2), (m6), (m7) and (m8) where the search direction is in the reverse direction.

When a determination is made that the comparison operation belongs to the first group at S18, high speed search is carried out in the forward direction while reading out auxiliary information at a speed of $b_2/b_1$ times (8 times) the tape travel speed of normal reproduction (S19). When a determination is made that the comparison operation belongs to the second group at S18, high speed search is carried out in the reverse operation while reading out auxiliary information at a speed identical to the above-described case (S20).

Following S19 and S20, determination is made whether auxiliary information can be read out from the sector in which a tune is not being reproduced (non-reproduced sector) (S21). When auxiliary information is not recorded in tracks TRI-1 and 1-18 prior to S21, the search direction was determined with the number of the tune as "unknown". However, here determination is made whether auxiliary information is recorded in tracks TRI-1 and 1-18 while carrying out high speed search.

When determination is made that read out of auxiliary information is not possible at S21, the sequential order of the tune and the starting time of the tune from all auxiliary signals read out at the time of search execution (S22) are entered and stored in the memory. This provides the advantage that the information once obtained by a search operation is also used in a subsequent search operation. This information is lost when magnetic tape T1 is unloaded from the magnetic tape apparatus. Alternatively, this information is rewritten by new TOC information when TOC information is newly read in. Thus, when magnetic tape T1 is exchanged, search will be carried out without using the previously stored information. Furthermore, the TOC information becomes the information of highest priority for search.

Then, a determination is made whether the search has reached the end of magnetic tape T1 (S23). For example, if a tune of a specified number of 6 is specified when there are only 5 tunes recorded on a tape as shown in FIG. 10(c), the search will be carried out in the forward direction until the end of the tape while the specified tune is not detected, resulting in an invalid search operation. Therefore, when determination is made that the search has not reached the end of tape at S23, the process returns to S21 to continue the search. If determination is made that the search has reached the end, the normal rewind operation is carried out at once (S24).

When rewind is completed, reproduction is carried out (S25), followed by entering the TOC information into the processing unit of microcomputer 17 (S26). At S27, determination is made whether the specified tune is present or not according to the TOC information. If that tune is not present, error is displayed on operation key panel 19 (S28). If the specified tune is present, the process proceeds to S36 which will be described afterwards since there is a possibility of the tune number not being read out by some reason.

When determination is made that a read out operation of auxiliary information is possible at S21, the tune number and the starting time of the tune are supplied and held in the memory as in S22 (S29). At S30, determination is made whether the currently reproduced tune is a tune right before the specified tune. If YES, the magnetic tape apparatus stops right before the head of the specified tune (S31). Then, the specified tune is reproduced (S32) to complete the search operation.

When determination is made that the currently reproduced tune is not a tune immediately proceeding the specified tune at S30, the process proceeds to S33 where determination is made whether the tune of the non-reproduced sector corresponding to the position of the currently reproduced tune is a tune immediately succeeding the specified tune. If NO, the process returns to S29, otherwise to S34 where the magnetic tape apparatus stops right before the end of the specified tune. Here, head main body 2 is reversed (S35), and the specified tune is reproduced at S32. Thus, the search operation is completed.

In the process succeeding the above-described processes of S6 and S26, a search operation utilizing TOC information is carried out. The TOC information is already entered in the processing unit of microcomputer 17 at S6 and S26 prior to this search operation process.

Figure 14:
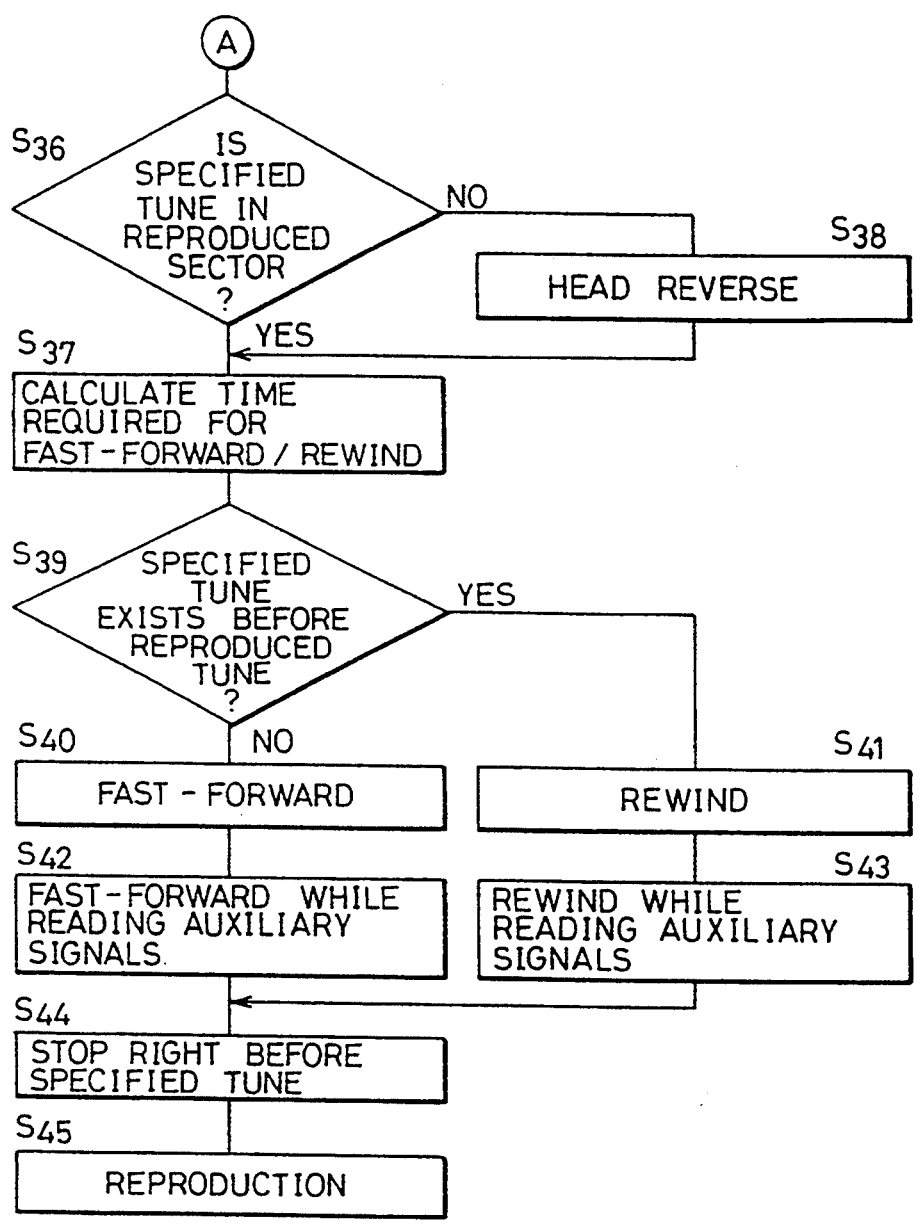
FIG. 14 is another flow chart showing the process of the flow chart of FIG. 12, indicating the operation procedure of search-reproduction carried out using TOC information by the magnetic tape apparatus of FIG. 1.

From this state as shown in FIG. 14, determination is made whether the specified tune resides in the sector of the currently reproduced tune (reproduced sector) at S36. If YES, the time required for fast-forward/rewind is calculated (S37) from the time of the currently reproduced tune, the starting time of the specified tune, the length of magnetic tape T1 (maximum recording time), and the tape travel speed of fast-forward/rewind. If determination is made that the specified tune does not reside in the reproduced sector at S36, head main body 2 is reversed (S38) to carry out the process of S37.

At S39, determination is made whether the specified tune resides prior to the currently reproduced tune. If determination is made that the specified tune resides after the reproduced tune, the tape is fast-forwarded for a time period obtained at S37 (S40). If determination is made that the specified tune precedes the reproducing tune, the tape is rewound for a time period obtained at S37 (S41).

The time period obtained at S37 is an estimated value and is set slightly shorter so that a target position (a start point of a specified tune) is never passed over at the time of search. Therefore, when the target position is close, fast-forward is carried out at a tape travel speed of $b_2/b_1$ times (8 times) the speed of normal reproduction while reading out auxiliary signals (S42). Also at the time of rewind, when the target position is close, fast-forward is carried out at the above-described tape travel speed while reading out auxiliary signals (S43).

Thus, the target position can be detected more precisely by carrying out a search while reading out auxiliary signals in the above-described manner. When a specified tune is found, the tape apparatus stops right before the head of the specified tune (S44). Then, the specified tune is reproduced (S45), and the search operation is completed.

As described above, the magnetic tape apparatus of the present embodiment reads out auxiliary signals simultaneously from both sectors $\alpha_1$ and $\beta_1$ to carry out high speed search according to information such as the tune number and the like obtained from the auxiliary signals. Thus, the position of a specified tune can be detected appropriately and the beginning of a specified tune can be obtained at a short time.

In the present embodiment, a high speed search operation by TOC information and a high speed search operation while reading out auxiliary signals have been described. When high speed search is carried out by TOC information, magnetic tape T1 is run at the normal fast-forward/rewind speed which is set to approximately 15-30 times the tape travel speed of normal reproduction. When high speed search is carried out while reading out auxiliary signals, the tape travel speed is $b_2/b_1$ times (8 times in the present embodiment) the tape travel speed of normal reproduction. This means that a high speed search according to TOC information can be carried out in a shorter time as the distance from the start of the high speed search to the target position longer.

Figure 15:
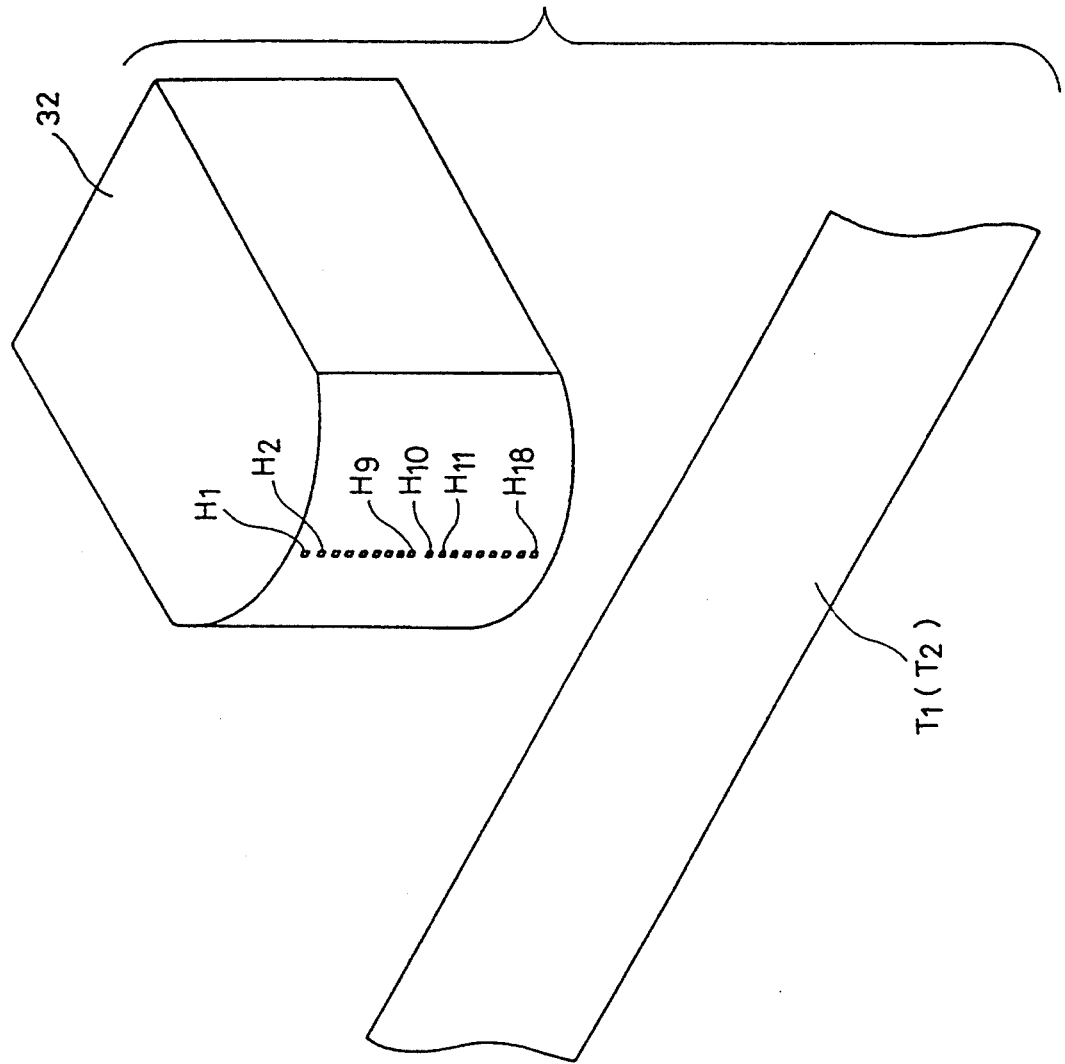
FIG. 15 is a perspective view showing a structure of a head unit that can be substituted for the reverse head device of FIG. 8 in the magnetic tape apparatus of FIG. 1.

The magnetic tape apparatus of the present invention is implemented to reproduce a magnetic tape T1 in which digital recording is carried out and a magnetic tape T2 in which analog recording is carried out, wherein a head DH10 for digital is also provided at the side of heads AH1 and AH2 for analog in head main body 2 as shown in FIG. 9 to read out auxiliary signals from sectors $\alpha_1$ and $\beta_1$. Such a head structure may be substituted by a head unit 32, for example, as shown in FIG. 15.

Head unit 32 includes digital heads H1-H18 corresponding to tracks TRI-1-TRI-18, respectively, of magnetic tape T1. In reproducing magnetic tape T1 with this head unit 32, main signals are read out by heads H2-H9 or heads H10-H17, and auxiliary signals are read out by heads H1 and H 18. In reproducing magnetic tape T2, a head group of heads H2-H9 or heads H10-H17 respectively read out signals, whereby the output of the heads re merged to obtain read out signals.

Such a head unit 32 eliminates the need of a head reverse operation to reduce the time required for reversing the direction of the tape travel.

Although the present invention has been described and illustrated in detail, it is clearly understood that the same is by way of illustration and example only and is not to be taken by ways of limitation, the spirit and scope of the present invention being limited only by the terms of the appended claims.

What is claimed is:

1. A magnetic tape apparatus, comprising:
   a magnetic tape including a forward direction recording region and a reverse direction recording region, each region having plural main information tracks and one auxiliary information track;
   a tape drive for reciprocally driving the magnetic tape;
   an information reader for reading main information including a plurality of selections recorded on one of the main information tracks in one of the forward and reverse direction recording regions and auxiliary information recorded on the auxiliary information track on the other of the forward and reverse direction recording regions; and
   a search reproduction controller for controlling the tape drive to search for a main information selection specified for reproduction recorded in the one of the forward and return direction recording regions based on the auxiliary information read from the auxiliary information track in the other of the forward and return direction recording regions, wherein the search reproduction controller determines a search direction of the selected main information by extracting current recording position information from the auxiliary information substantially simultaneously read out from both forward and reverse recording regions by the information reader and comparing the extracted recording position information and the recording position information of the selected main information.

2. The magnetic tape apparatus according to claim 1, wherein when a transfer speed of auxiliary information at the time of reproduction is $b_1$ and a transfer speed of main information at the time of reproduction is $b_2$, the search reproduction controller controls the tape drive to drive the magnetic tape at a speed $b_2/b_1$ times a tape reproduction speed.

3. The magnetic tape apparatus according to claim 1, wherein said information reader includes a head mechanism with one portion of the head mechanism used for reproducing a digital signal recorded on magnetic tape, and another portion used for reproducing an analog signal recorded on magnetic tape.

4. The magnetic tape apparatus according to claim 3, wherein
- the one portion includes plural heads for reading plural areas of main digital information and a head for reading out auxiliary information,
- the another portion includes plural heads for reading out plural areas of analog information and a head for reading out auxiliary information.

5. The magnetic tape apparatus according to claim 1, wherein table of contents information identifying the main information, including a location of each of the selections on the tape, is recorded on at least one area of the tape and the search reproduction controller uses the table of contents information to search for the main information selection.

6. The magnetic tape apparatus according to claim 1, wherein the auxiliary information includes a number indicating the position of a corresponding main information selection on the magnetic tape.

7. The magnetic tape apparatus according to claim 6, wherein the number indicates an order of recording of main information selections on the magnetic tape.

8. A magnetic tape apparatus, comprising:
- a magnetic tape including a forward direction recording region and a reverse direction recording region, each region having plural main information tracks and one auxiliary information track;
- a tape drive for reciprocally driving the magnetic tape;
- an information reader for reading main information including a plurality of selections recorded on one of the main information tracks in one of the forward and reverse direction recording regions and auxiliary information recorded on the auxiliary information track on the other of the forward and reverse direction recording regions; and
- a search reproduction controller for controlling the tape drive to search for a main information selection specified for reproduction recorded in the one of the forward and return direction recording regions based on the auxiliary information read from the auxiliary information track in the other of the forward and return direction recording regions, wherein the auxiliary information read out from the auxiliary track is written into a first-in-first-out (FILO) memory and then retrieved by the search reproduction controller in the search for the main information selection.

9. A magnetic tape apparatus comprising:
- a magnetic tape divided into a forward direction recording region and a return direction recording region with each recording region including a plurality of main information selection tracks and an auxiliary information track;
- a tape drive for driving a magnetic tape in the forward and return directions;
- a tape reader for reading main information from a main information track in one of the forward and return direction recording regions and substantially simultaneously reading auxiliary information from the auxiliary information track in both forward and return direction recording regions; and
- a controller for controlling a search for a selected main information selection using the auxiliary information read by the tape reader.

10. A magnetic tape apparatus comprising:
- a magnetic tape divided into a forward direction recording region and a return direction recording region with each recording region including a plurality of main information selection tracks and an auxiliary information track;
- a tape drive for driving a magnetic tape in the forward and return directions;
- a tape reader for reading main information from a main information track in one of the forward and return direction recording regions and substantially simultaneously reading auxiliary information from the auxiliary information track in both forward and return direction recording regions; and
- a controller, including a memory for storing auxiliary information read from the auxiliary information track of one of the forward and return direction recording regions in first-in last-out fashion, for controlling a search for a main information selection using auxiliary information retrieved from the first and second memories.

* * * * *